United States Patent Office

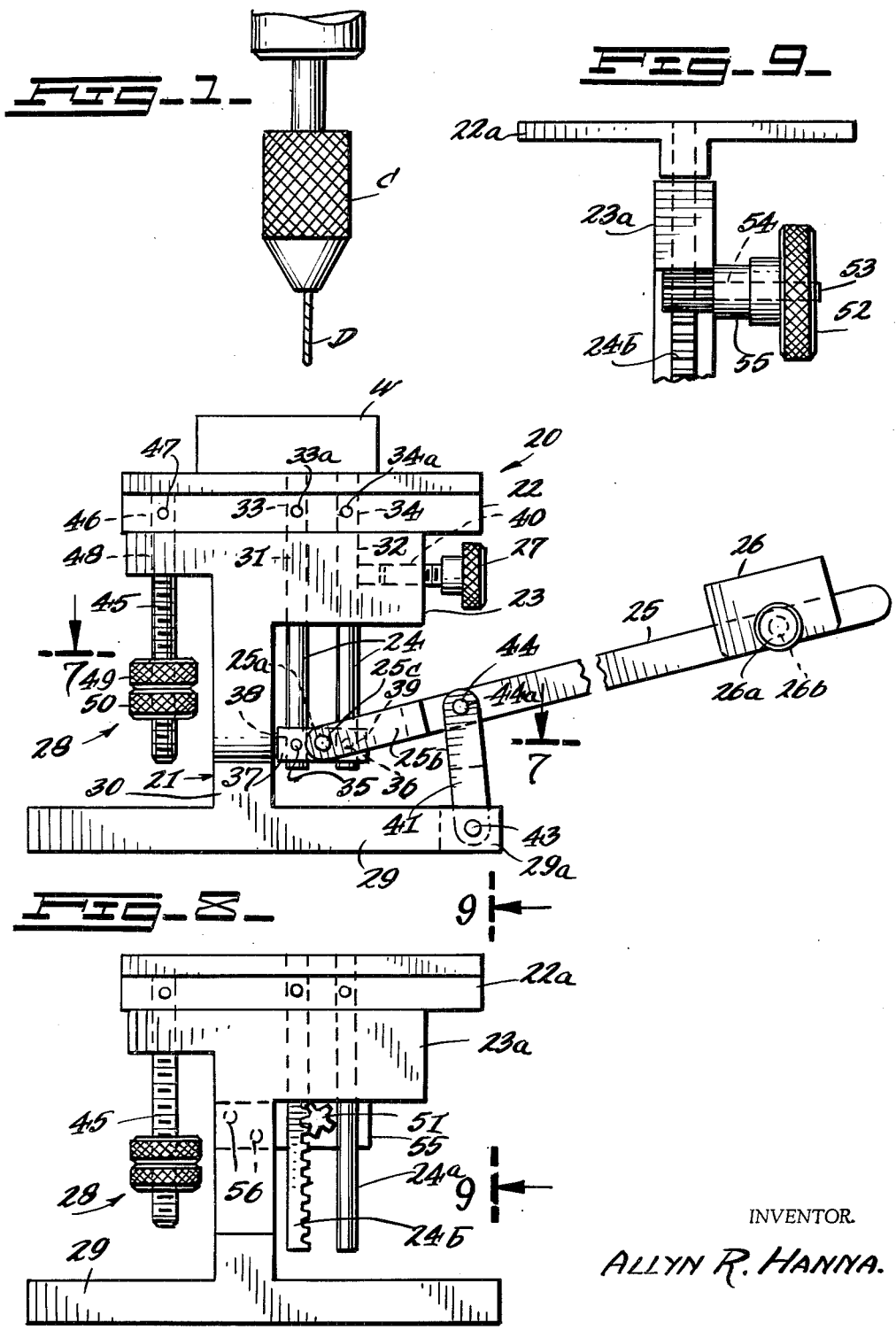

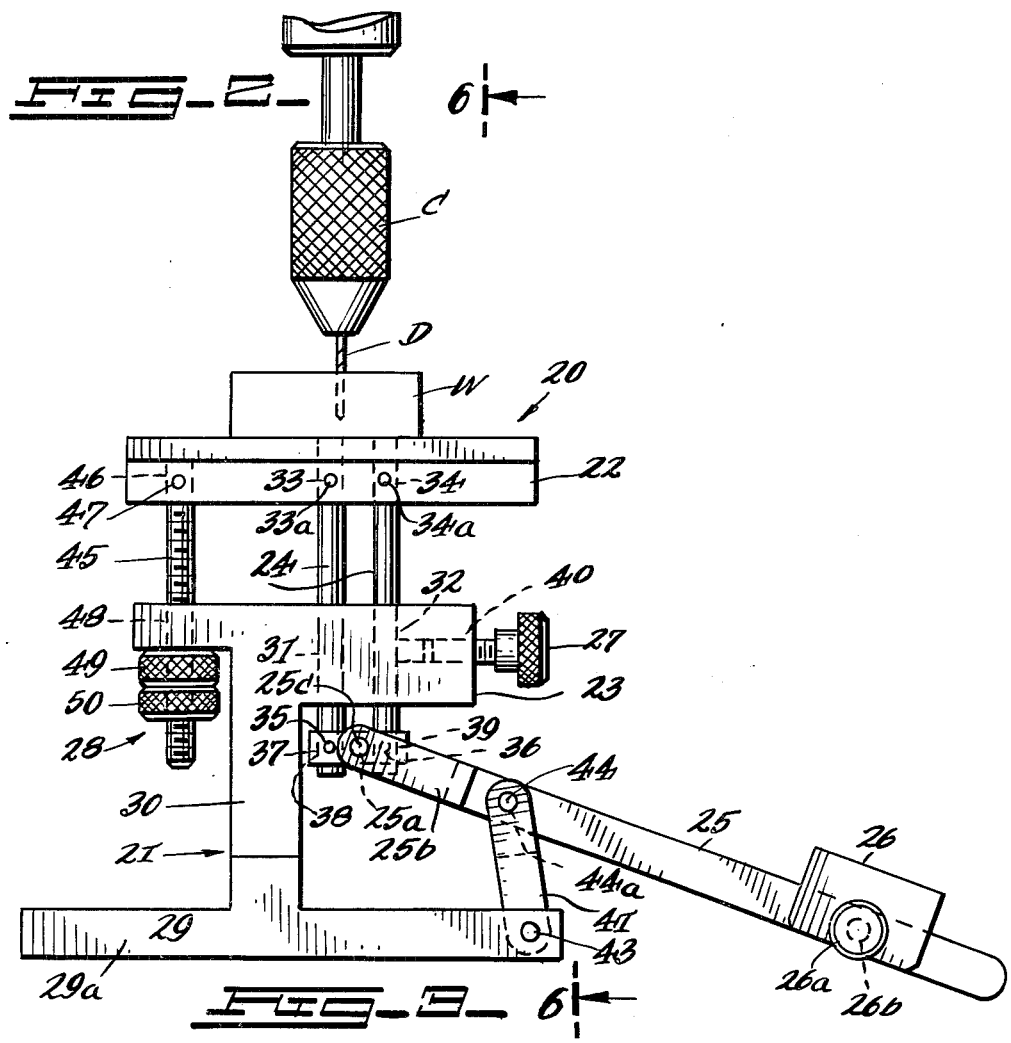
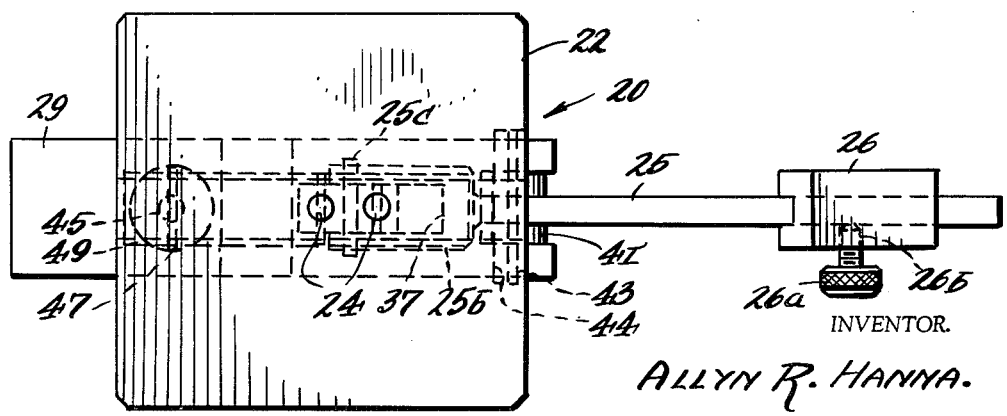

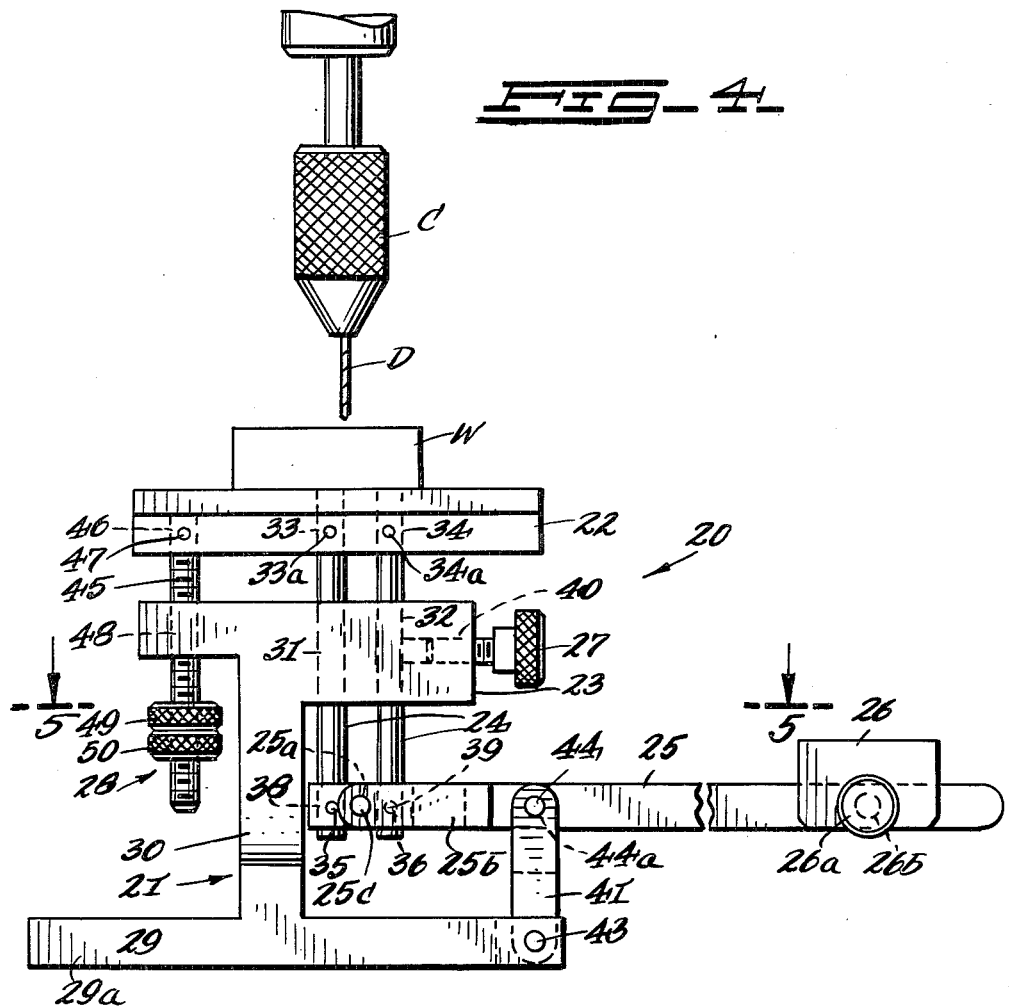
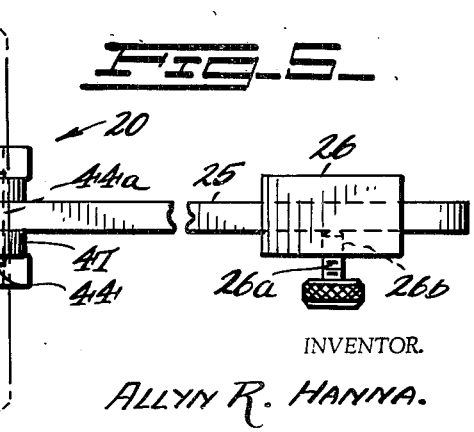

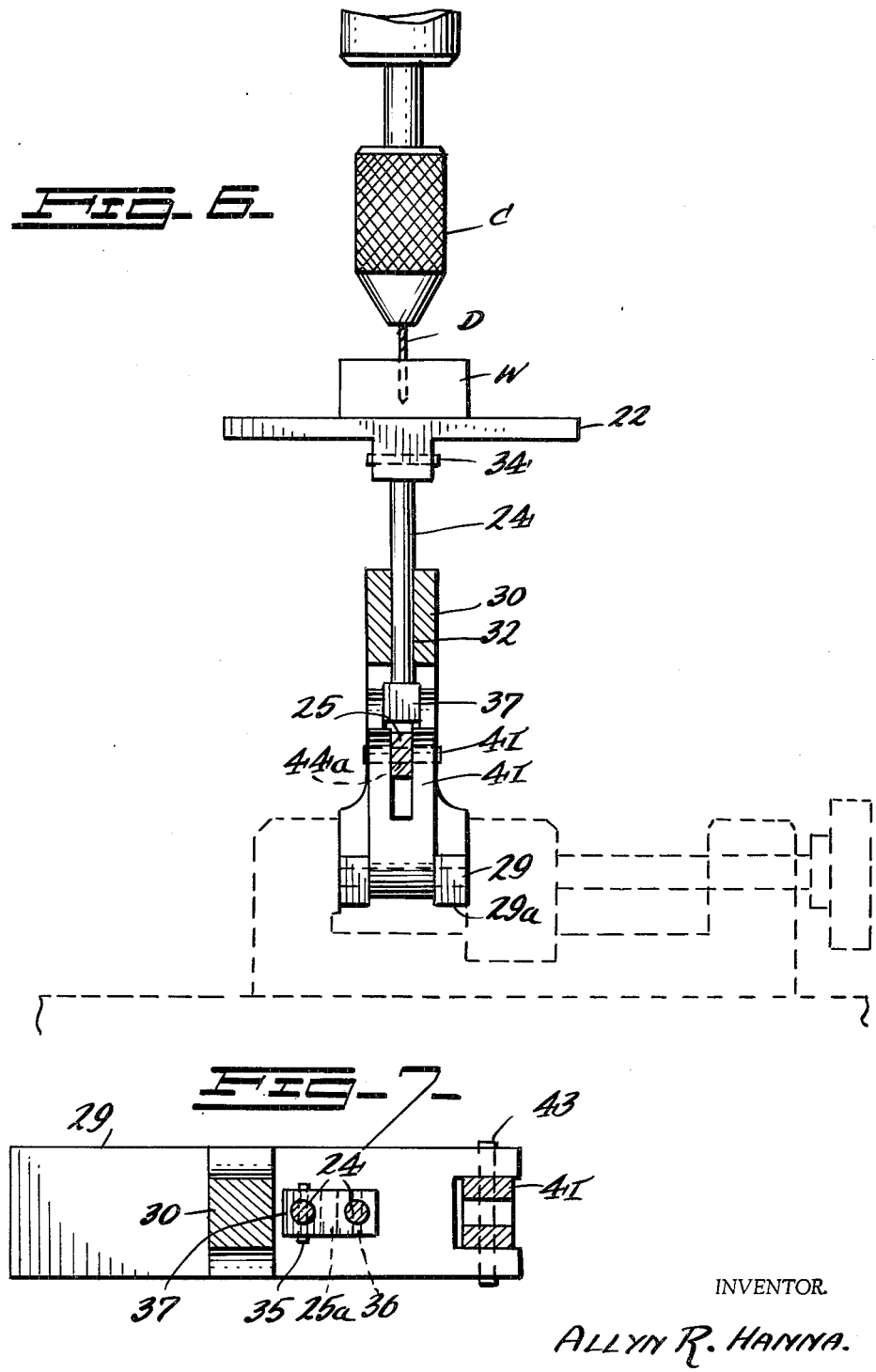

3,212,367
Patented Oct. 19, 1965

3,212,367
VERTICALLY MOVABLE TABLE
Allyn R. Hanna, 154, Main St., Mount Morris, N.Y.
Filed Apr. 24, 1963, Ser. No. 275,439
3 Claims. (Cl. 77—63)

The present invention relates to drilling presses, and more particularly to a sensitive press for drilling miniature holes. The primary object of this invention being to provide a drill press, electric-motor operated, by means of which holes of very small diameter may be drilled quickly and effectively with a minimum amount of time and high-speed drill breakage. The type of sensitive drill herein described is a fully self-contained and inexpensive unit which may do the work of several expensive drilling machines at a cost that small shops can afford.

Another object of this invention is to provide a highly sensitive drilling device which may be inexpensive to manufacture, simple and easy to operate, and foolproof.

Another object of this invention is to provide a highly sensitive drilling machine to drill precision holes in the small sizes ordinarily from No. 60 through No. 80 and smaller which regular drill presses cannot readily handle.

Another object of this invention is to provide the drill press herein described with a base which may be readily secured to vertical milling machines or to jig borers, and one which may be put on or taken off the borer at will so as not to tie up the machine.

An additional object of this invention is to provide the sensitive drilling device with a special base by means of which it may be readily clamped to a drill press table or mounted in a vise or chuck.

A further object of this invention is to provide the sensitive drill press with a chuck to hold the work to be drilled or a work table, with the table held in the press movable in a vertical plane, and manually operated by means of a handle to raise and to lower the work table as desired.

A further object of this invention is to provide the sensitive drill borer with a counter weight adjustably held upon said handle and which may be adjusted along the handle until the load of the work held upon said table is balanced similar to the setting in a beam scale.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings, where like character numerals denote like or corresponding parts throughout the several views, in which:

FIG. 1 is a side elevational view showing the embodiment of the present invention in inoperative position;

FIG. 2 is a similar view to FIG. 1 showing the invention in an operative position;

FIG. 3 is a top elevational view of FIG. 2;

FIG. 4 is a side elevational view similar to FIGS. 1 and 2 showing the invention in a neutral position;

FIG. 5 is a section taken on the line 5—5 of FIG. 4;

FIG. 6 is a view taken on the line 6—6 of FIG. 2 in partial cross-section;

FIG. 7 is a section taken on the line 7—7 of FIG. 1; and

FIGS. 8 and 9 show a modification.

It is to be understood that the present form of disclosure is merely for the purpose of illustration and that there might be devised various modifications thereof without departing from the spirit of the invention as herein set forth.

Referring now more particularly to the drawings, the sensitive drill press 20, made in accordance with the present invention, best shown in FIG. 1, comprises, in combination, the vertical frame 21; the work table 22; the work table support 23; the work table guide rods 24; the operating handle 25; the adjustable counterweight 26; the locking screw 27; and the limiting adjustable nuts 28.

The vertical frame 21, best seen in FIG. 1, consists of the elongated horizontal base 29, the vertical section 30 and the head section or work table support 23. A pair of holes 31 and 32, respectively, are drilled side by side in the support 23 to receive the vertically movable guide rods 24, which at the opposite end thereof are snugly fitted into the holes 33 and 34, respectively bored in the work table 22; the latter are in perfect alignment with the holes 31 and 32, respectively, in the support 23. The rods 24 are pinned by means of the dowel pins 33a and 34a to the support 22, substantially as shown, with the opposite ends thereof, by means of the dowel pins 35 and 36 being pinned to the connector block 37. The latter may be provided with the holes 38 and 39 to accommodate and to receive the opposite ends of the guide rods 24; the latter being in perfect alignment with the holes 31 and 32 in the support 23. A threaded hole 40 is provided in the support 23 to receive the set screw 27, which serves the purpose of locking the guide rods 24 in a desirable position facilitating the drilling operation.

By means of the rocker arm 41 which is rocked about the pin 43 which is locked in the base 29, at 29a, the operating handle 25 (which is provided with the counterweight 25) may be rocked on the pin 44 which is conveniently mounted in the rocker arm 41 and passes through a hole 44a in the handle 25. It can be seen that the counterweight 26 is provided with a locking knob 26a which is mounted in the threaded hole 26b in the counterweight 26 to be moved along the entire length of the handle 25 for the purpose of balancing the work W upon the work table 22. With its opposite end 25a the handle 25 is provided with the forked section 25b which snugly fits over the connector block 37 and is pinned thereto by means of the handle pin 25c. When the work W is ready to be drilled by the high-speed drill D in the chuck C, the handle 25 is manually operated to raise the work W to the drill D.

The work table 22 may be provided with the limiting and adjustable set screw means 28, which in the main consists of the vertical threaded bolt 45 which is pinned by means of the dowel pin 47 in the work table 22. The bolt 45 passes through a clearance hole 48 in the support 23 and upon its opposite end it is fitted with a pair of threaded nuts 49 and 50, respectively.

Referring to the modification shown in FIGS. 8 and 9, respectively, the work table 22a in this case is not provided with a pair of vertical guide rods 24 but may be instead provided with one single guide rod 24a and a gear rack 24b; the latter being in mesh and being operated by the gear pinion 51 which is manually rotated through the medium of the knob 52 (see FIG. 9). The pinion 51 has a pinion shaft 53 which is mounted to rotate in the hole 54 in the bearing 55; with the latter securely held to the support 23a by means of machine screws 56 or being formed as an integral part thereof. Otherwise the modification shown in FIGS. 8 and 9 is similar in design to the borer already shown and described in FIGS. 1 to 7, inclusive, except to the handle 25 which now has been replaced by the knob 56; also the connecting block 37 here is missing.

It will now be recognized from FIGS. 1 to 7, inclusive, that to operate the sensitive drill press herein described all that is necessary is to fasten the work W to the work table 22 (by means of clamps, magnetic chuck, etc.), then to proceed to adjust the weight by moving the counterweight 26 along the length of the handle 25. With the work balance, the borer 20 which is held to a vertical milling machine or a jig borer (not shown) is raised until a reasonable distance is left between the drill point D and the work W. Finally the work W is raised (by pushing upon the handle 25) until it contacts the end of the drill D; then the locking nuts 49 and 50 are threaded upon the bolt 45 until depth is adjusted by setting the adjusting nuts with a suitable gage to the depth desired. With the above adjustment completed, the lock screw 27 may be released and one may proceed to drill the hole in the work W (by pressing upon the handle 25 the work table 22 is raised to meet the drill D), until the adjusting nut 49 contacts the lower section of the support 22, substantially as shown in FIG. 2.

A careful examination of the foregoing description in conjunction with the invention as illustrated in the drawings, will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice as long as no departure is made from the invention claimed.

What I claim is as follows:

1. In a precision and sensitive press of the class described, the combination comprising, a vertical frame, a vertically movable work table, a pair of vertical guide rods, a connector block, an operating handle, a forked section in said handle and means for raising and lowering said work table by said handle, said means comprising a rocker arm, said arm having one end thereof secured to said frame to rock upon a pin, with the other end of said rocker being held to said handle to rock upon a second pin, the fork in said handle being secured to said connector block by means of a third pin, said connector block having a pair of holes, said pair of vertical guide rods mounted in said holes, with opposite ends of said rods being held in holes drilled in said work table, the operation upon said handle raising and lowering said connector block and respectively said guide rods by means of said rocker arm to raise or to lower said work table.

2. The combination according to claim 1, the holes in said connector block being in perfect alignment with holes in said frame, said guide rods being fitted to slide in said holes in said frame, the lowering and raising of said connector block and respectively said guide rods by said handle lowering and raising said work table as set forth.

3. The combination according to claim 1, and an adjustable screw means to limit the vertical movement of said work table, said means including a vertical threaded bolt held by said work table, said bolt passing through clearance holes in said frame, adjustable nuts threaded to said bolt, the manual adjusting of the position of said nuts upon said threaded bolt limiting the vertical movement of said table in said frame.

References Cited by the Examiner

UNITED STATES PATENTS 336,849    2/86    Frech.

WILLIAM W. DYER, Jr., *Primary Examiner.*

FRANCIS S. HAUSAR, *Examiner.*